July 30, 1929.   M. C. TURNER   1,722,360
LAMP
Filed Feb. 16, 1928   2 Sheets-Sheet 1

INVENTOR
Mark Carnall Turner.
by I. Owden O'Brien
atty.

July 30, 1929.　　　M. C. TURNER　　　1,722,360
LAMP
Filed Feb. 16, 1928　　　2 Sheets-Sheet 2
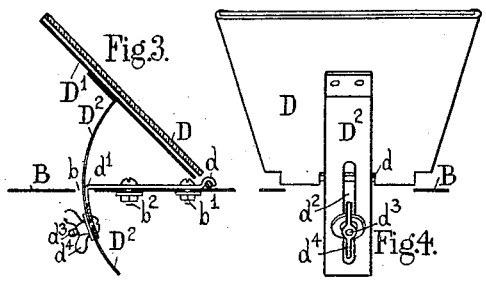
Fig.3.
Fig.4.
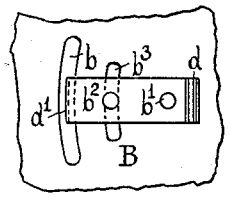
Fig.5.
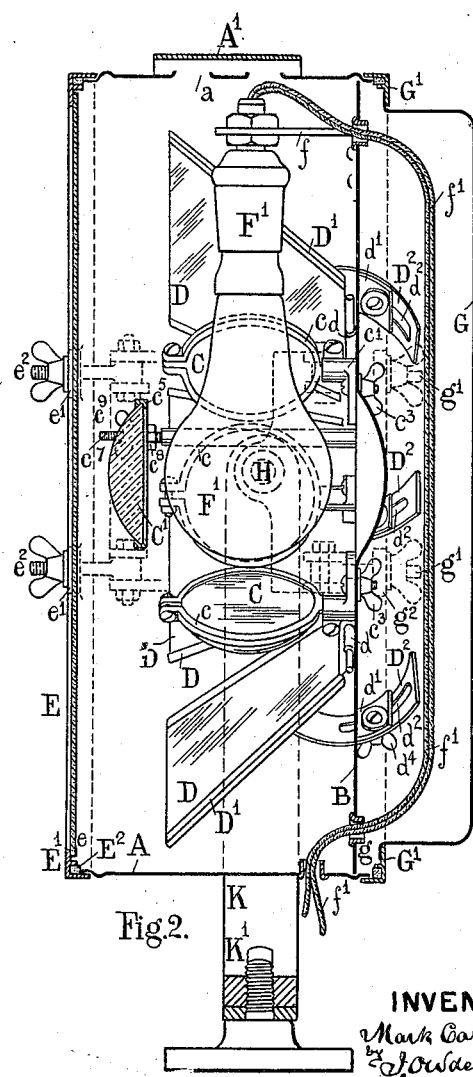
Fig.2.
INVENTOR
Mark Carnall Turner Patented July 30, 1929.

1,722,360

UNITED STATES PATENT OFFICE.

MARK CARNALL TURNER, OF HYDE, ENGLAND, ASSIGNOR TO JOHNSON & TURNER LIMITED, OF HYDE, ENGLAND.

LAMP.

Application filed February 16, 1928, Serial No. 254,859, and in Great Britain July 26, 1927.

This invention relates to lanterns for street, factory, docks, harbours, pit head, railway siding, shop front and similar illuminating purposes and more particularly to such lanterns of the type in which the light source is surrounded by a number of plano-convex lens which direct the rays of light on to a number of mirrors to deflect the rays in the required direction.

According to the present invention each of the mirrors is hinged to or pivotally mounted on a bracket which bracket is also pivoted on the frame of the lantern so that each mirror can be moved independently to allow the rays of light from the source of illumination to be deflected in any desired direction.

The invention will be described with reference to the accompanying drawings:—

Fig. 2 is a vertical section through the lantern.

Fig. 3 is a side view of a mirror showing the manner in which it is mounted.

Fig. 4 is a rear view of same.

Fig. 5 is a plan of same from below.

Figures 1, 6, 7:
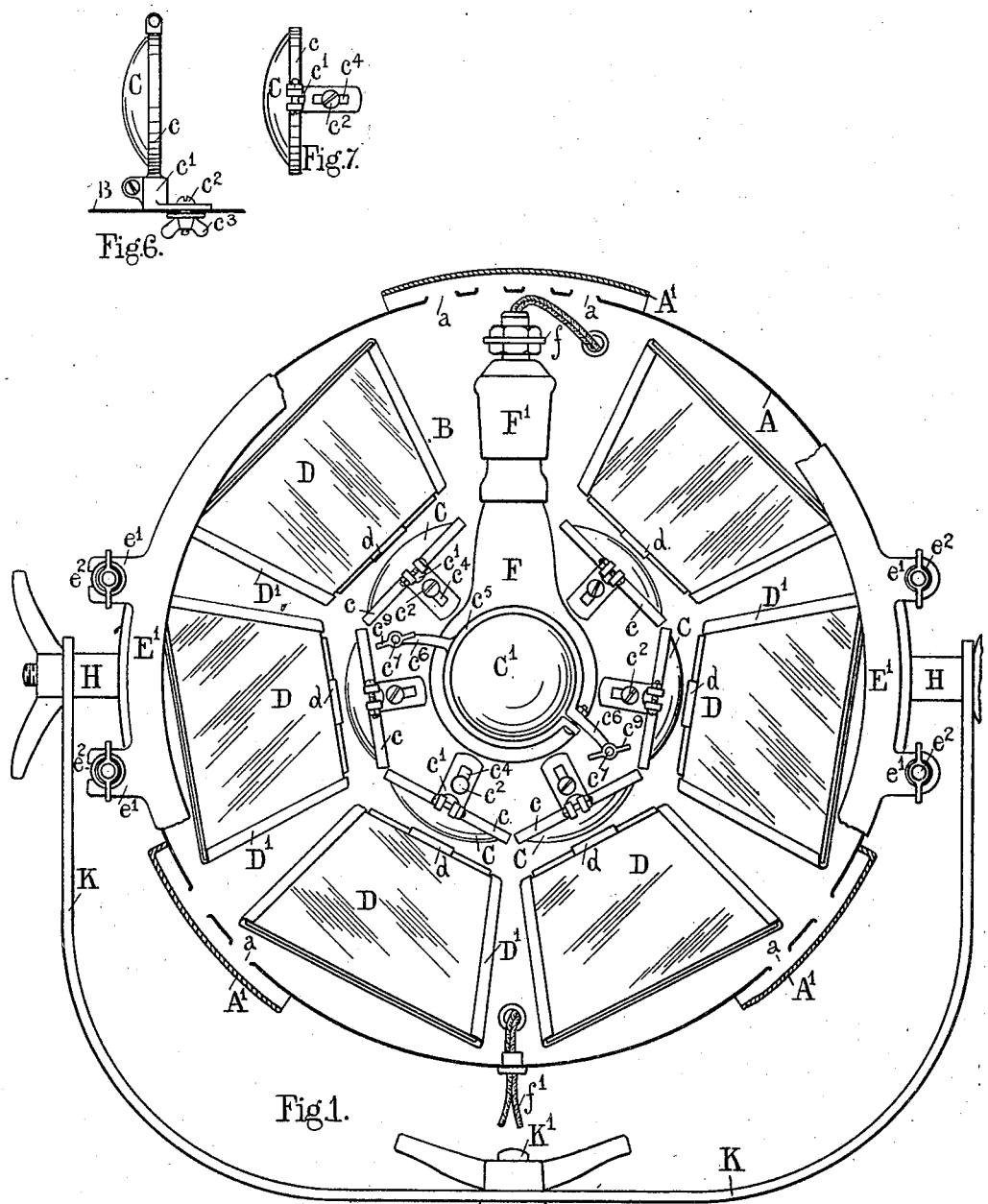
Fig. 1 is a front elevation partly in section of the lantern.
Fig. 6 is a side view of a lens.
Fig. 7 is a plan of same.

The lantern comprises a cylindrical casing A to which is affixed by welding, soldering or in any other suitable way to a disc B which carries the mountings for the lenses C and the mirrors D. The front of the casing A is closed by a circular sheet of glass E which is carried by a flanged ring $E^1$ secured thereto by clips or brackets $e$. The ring $E^1$ is formed with lugs $e^1$ and corresponding lugs are formed on the casing A so that the ring $E^1$ can be affixed to the cylinder by the pivoted bolts $e^2$. A packing ring $E^2$ of rubber or other suitable material is preferably inserted between the ring $E^1$ and the end of the casing A to make a tight joint between them. The plate B is enclosed by a cover G which is affixed to the casing A by a flanged ring $G^1$, a packing ring $g$ of rubber or other suitable material being inserted between the end of the casing A and the flanged ring $G^1$ to give a water-tight joint between them. Bolts $g^1$ are hinged to lugs on the casing A and pass through slots in corresponding lugs $g^2$ in the ring $G^1$ so that by tightening up the nuts on the bolts $g^1$ the ring $G^1$ is secured to the casing A.

Ventilation apertures $a$ are formed at intervals around the casing A, the apertures $a$ being covered by covers $A^1$ to prevent rain or moisture entering into the interior of the casing A.

The source of light F which is preferably an electric lamp is arranged in the central axis of the casing A being carried in a lamp holder $F^1$ supported by a bracket $f$ attached to the rear plate B near the top thereof as shown in Figs. 1 and 2. The cables $f^1$ supplying the current to the lamp pass into the casing A at the bottom, through the plate B to the outside thereof and back into the casing A at the top near the bracket $f$.

The lamp F is surrounded by a number of plano-convex lens C each of which is mounted in a holder $c$ carried in a bracket $c^1$ affixed to the rear plate B by the screw $c^2$ passing through the plate B and clamped by the ring nut $c^3$. A slot $c^4$ which is radial to the lamp F is formed in the base of the bracket $c^1$ so that the lens can be moved nearer to or further from the lamp F.

A plano-convex lens $C^1$ is preferably arranged also in front of the lamp F. The lens $C^1$ is carried in a holder $c^5$ provided with arms $c^6$ provided with holes which pass over screwed rods $c^7$ projecting from the rear plate B so that the lens can be clamped at any desired distance from the lamp F by the lock nuts $c^8$ and wing nuts $c^9$.

Each lens C directs the rays of light on to a mirror D which deflects them out of the lantern in the desired direction. Each mirror D is carried in a frame $D^1$ which is hinged or pivotally mounted to one end $d$ of a bracket affixed to the rear plate B. The other end $d^1$ of the bracket is bent and passes through a curved slot $b$ in the plate B to the outside of the plate.

A quadrant shaped arm $D^2$ is affixed to the frame $D^1$ and extends through the slot $b$ to the rear of the plate B adjacent to the end $d^1$ of the bracket on which the frame $D^1$ is hinged the end $d^1$ being curved to correspond with the curvature of the arm $D^2$. A slot $d^2$ is formed which works over a bolt $d^3$ carried by the end $d^1$ of the bracket so that by moving the quadrant arm $D^2$ over the bolt $d^3$ the mirror D can be hinged or pivoted about its bracket and clamped in any desired position by tightening up the wing nut $d^4$ on the bolt $d^3$.

The end of the bracket on which the frame $D^1$ is hinged or pivoted is secured to plate B by the bolts $b^1$ and $b^2$. The bolt $b^1$ passes through a hole in the plate B and the bolt $b^2$ passes through a curved slot $b^3$ in the plate B concentric with the slot $b$. Thus by loosening the nuts on the bolts $b^1$ and $b^2$ to adjust the mirror D in a plane at right angles to the adjustment obtained by the quadrant arm $D^2$ thus giving adjustment of the mirror in every direction.

The casing A is preferably mounted in trunnions H so that it can be swivelled about such trunnions and the trunnions H are carried in a stirrup K which is pivotally mounted on a stud $K^1$ so that the trunnions H and the casing can be moved about an axis at right angles to the axes of the trunnions H.

What I claim as my invention and desire to protect by Letters Patent is:—

1. A lantern of the type referred to comprising a casing, a centrally dished disc rigidly carried by the casing, a bracket mounted on the disc, a holder and lamp suspended from said bracket, any light striking the disc being reflected forward by the dished portion thereof, a plurality of mirrors pivoted to said disc and means for adjusting the mirrors relatively to the disc and to each other, a plurality of lenses mounted on said disc between the lamp and the mirrors one lens being arranged opposite each mirror, means for varying the lenses relatively to the disc to each other, a glass front to the casing through which the light is transmitted, a further lens arranged between the lamp and the glass front to control the light transmitted forward by the lamp, rods carried by the disc upon which the further lens is mounted and means for adjusting the position of this lens.

2. A lantern of the type referred to comprising a casing, a centrally dished disc rigidly carried by the casing, a bracket mounted on the disc, a holder and lamp suspended from said bracket, any light striking the disc being reflected forward by the dished portion thereof, a plurality of mirrors pivoted to said disc, quadrant shaped arms and brackets for adjusting the mirrors relatively to the disc, a plurality of lenses mounted on said disc between the lamp and the mirrors, one lens being arranged opposite each mirror, adjustable brackets by which the lenses are carried and by which they are adjusted relatively to the mirrors, a glass front to the casing through which the light is transmitted, a further lens arranged between the lamp and the glass front to control the light transmitted forward by the lamp, rods carried by the disc upon which the further lens is mounted and means for adjusting the position of this lens.

3. A lantern of the type referred to as in claim 1 having trunnions mounted upon the casing, a stirrup shaped member supporting the trunnions, and a vertical stud upon which the stirrup is pivoted.

In testimony whereof I have hereunto set my hand.

MARK CARNALL TURNER.